United States Patent
Hong et al.

(10) Patent No.: US 12,407,035 B2
(45) Date of Patent: Sep. 2, 2025

(54) METHOD FOR RECOVERING ACTIVE METAL OF LITHIUM SECONDARY BATTERY

(71) Applicant: SK INNOVATION CO., LTD., Seoul (KR)

(72) Inventors: Suk Joon Hong, Daejeon (KR); Hyeon Bae Ha, Daejeon (KR); Ji Min Kim, Daejeon (KR); Min Ji Sung, Daejeon (KR); Sung Real Son, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 601 days.

(21) Appl. No.: 17/907,816

(22) PCT Filed: Feb. 23, 2021

(86) PCT No.: PCT/KR2021/002257
§ 371 (c)(1),
(2) Date: Aug. 29, 2022

(87) PCT Pub. No.: WO2021/172846
PCT Pub. Date: Sep. 2, 2021

(65) Prior Publication Data
US 2023/0108786 A1   Apr. 6, 2023

(30) Foreign Application Priority Data
Feb. 27, 2020   (KR) .................... 10-2020-0024001

(51) Int. Cl.
*H01M 10/54* (2006.01)
*C22B 5/12* (2006.01)
*C22B 26/12* (2006.01)

(52) U.S. Cl.
CPC ............... *H01M 10/54* (2013.01); *C22B 5/12* (2013.01); *C22B 26/12* (2013.01)

(58) Field of Classification Search
CPC ........... H01M 10/54; C22B 5/12; C22B 26/12
See application file for complete search history.

(56) References Cited

U.S. PATENT DOCUMENTS

2013/0266855 A1   10/2013   Kim et al.
2015/0052739 A1    2/2015   Deb

FOREIGN PATENT DOCUMENTS

CN   103794832 A   5/2014
CN   106834703 A   6/2017
(Continued)

OTHER PUBLICATIONS

European Search Report for EP 21760065.9 issued on Aug. 7, 2023 from European patent office in a counterpart European patent application.
(Continued)

*Primary Examiner* — Anthony J Zimmer
*Assistant Examiner* — Annette Phan
(74) *Attorney, Agent, or Firm* — The PL Law Group, PLLC

(57) ABSTRACT

In a method for recovering an active metal of a lithium secondary battery, a cathode active material mixture is prepared from a cathode of a lithium secondary battery. A first reductive process using a first reductive reaction gas and a second reductive process using a second reductive reaction gas that has a higher reaction source concentration than that of the first reductive reaction gas are performed sequentially and continuously to convert the cathode active material mixture into a preliminary precursor mixture. A lithium precursor is recovered from the preliminary precursor mixture. A lithium recovery ratio may be increased by a stepwise reduction while preventing an increase of heating value.

10 Claims, 1 Drawing Sheet

(56) References Cited

FOREIGN PATENT DOCUMENTS

| | | | |
|---|---|---|---|
| CN | 107017443 A | 8/2017 | |
| CN | 108220607 A | 6/2018 | |
| CN | 110408796 A | 11/2019 | |
| JP | 2002-327215 A | 11/2002 | |
| JP | 2004-011010 A | 1/2004 | |
| JP | 2005-113226 A | 4/2005 | |
| JP | 2011-094228 A | 5/2011 | |
| JP | 2012-229481 A | 11/2012 | |
| KR | 101294335 B1 * | 8/2013 | ......... H01M 4/1397 |
| KR | 10-2015-0094412 A | 8/2015 | |
| KR | 10-1623930 B1 | 5/2016 | |
| KR | 10-1731213 B1 | 4/2017 | |
| KR | 10-1927044 B1 | 3/2019 | |
| KR | 10-2019-0065882 A | 6/2019 | |
| KR | 10-2020238 B1 | 9/2019 | |
| WO | WO 2007/129845 A1 | 11/2007 | |
| WO | WO 2020/011765 A1 | 1/2020 | |

OTHER PUBLICATIONS

Office action issued on Dec. 26, 2023 from China Patent Office in a counterpart Chinese Patent Application No. 202180017025.0 (all the cited references are listed in this IDS.) (English translation is also submitted herewith.).

International Search Report for PCT/KR2021/002257 mailed on Jun. 1, 2021.

Office action issued on Feb. 25, 2025 from Japan Intellectual Property Office in a counterpart Japanese Patent Application No. 2022-551365 (all the cited references are listed in this IDS.) (English translation is also submitted herewith.).

* cited by examiner

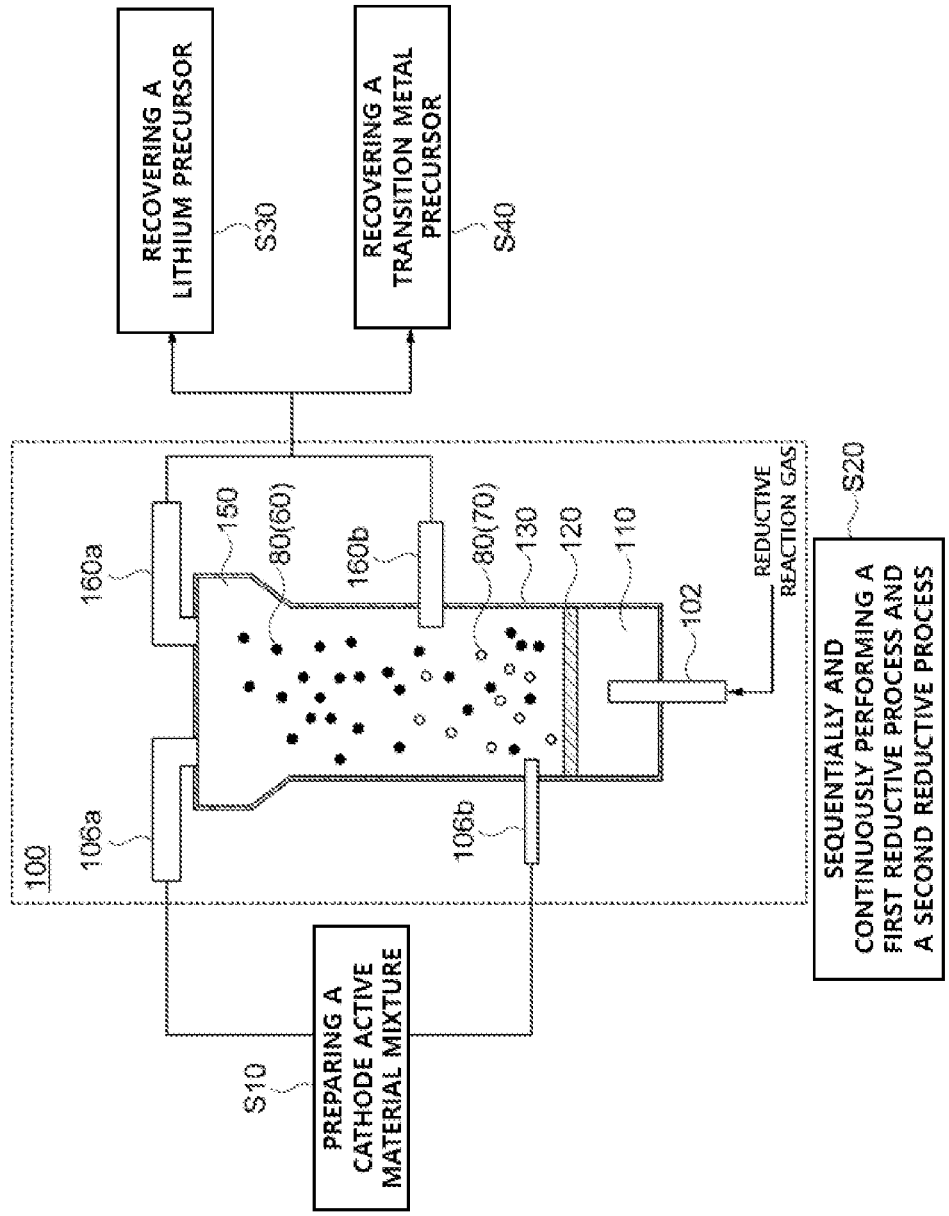

METHOD FOR RECOVERING ACTIVE METAL OF LITHIUM SECONDARY BATTERY

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/002257 filed on Feb. 23, 2021, which claims priority to the benefit of Korean Patent Application No. 10-2020-0024001 filed in the Korean Intellectual Property Office on Feb. 27, 2020, the entire contents of which are incorporated herein by reference.

BACKGROUND

1. Technical Field

The present invention relates to a method for recovering an active metal of a lithium secondary battery. More particularly, the present invention relates to a method for recovering an active metal from a waste cathode of a lithium secondary battery.

2. Background Art

Recently, a secondary battery has been widely employed as a power source of a mobile electronic device such as a camcorder, a mobile phone, a laptop computer, etc., and a vehicle such as an electric vehicle, a hybrid vehicle, etc. A lithium secondary battery has been actively developed and applied among the secondary battery due to advantages such as high operational voltage and energy density per unit weight, a high charging rate, a compact dimension, etc.

A lithium metal oxide may be used as an active material for a cathode of the lithium secondary battery. The lithium metal oxide may further contain a transition metal such as nickel, cobalt, manganese, etc.

As the above-mentioned high-cost valuable metals are used for the cathode active material, 20% or more of a production manufacturing cost is required for manufacturing the cathode material. Additionally, as environment protection issues have recently been highlighted, a recycling method of the cathode active material is being researched.

Conventionally, a method of sequentially recovering the valuable metals by leaching a waste cathode active material in a strong acid such as sulfuric acid has been used, but the wet process may be disadvantageous in aspect of a regeneration selectivity and a regeneration time, and may cause environmental pollution. Therefore, a method for recovering the valuable metals using a dry-based reaction is being researched.

However, a side reaction and a particle agglomeration may occur due to a reaction heat generated during the dry-based reaction, thereby degrading a recovery ratio of the active material.

For example, Korean Registered Patent Publication No. 10-0709268 discloses an apparatus and a method for recycling a waste manganese battery and an alkaline battery, but does not provide a dry-based method for regenerating valuable metals with high selectivity and high yield.

SUMMARY

According to an aspect of the present invention, there is provided a method for recovering an active metal of a lithium secondary battery with high recovery efficiency and high yield.

In a method for recovering an active metal of a lithium secondary battery according to embodiments of the present invention, a cathode active material mixture is prepared from a cathode of a lithium secondary battery. A first reductive process using a first reductive reaction gas and a second reductive process using a second reductive reaction gas that has a higher reaction source concentration than that of the first reductive reaction gas are sequentially and continuously performed to convert the cathode active material mixture into a preliminary precursor mixture. A lithium precursor is recovered from the preliminary precursor mixture.

In some embodiments, the first reductive reaction gas and the second reductive reaction gas may include comprise hydrogen, and a hydrogen concentration of the first reductive reaction gas may be smaller than a hydrogen concentration of the second reductive reaction gas.

In some embodiments, the hydrogen concentration of the first reductive reaction gas may be in a range from 5 to 15 volume %, and the hydrogen concentration of the second reductive reaction gas may be 20 volume % or more.

In some embodiments, the hydrogen concentration of the first reductive reaction gas may be in a range from 5 to 10 volume %, and the hydrogen concentration of the second reductive reaction gas may be in a range from 20 to 40 volume %.

In some embodiments, a reaction temperature of the second reductive process may be higher than a reaction temperature of the first reductive process.

In some embodiments, the reaction temperature of the first reductive process may be in a range from 300 to 450° C., and the reaction temperature of the second reductive process may be in a range from 460 to 800° C.

In some embodiments, the first reductive process and the second reductive process may include supplying the first reductive reaction gas and the second reductive reaction gas, respectively, into a fluidized bed reactor.

In some embodiments, the preliminary precursor mixture may include preliminary lithium precursor particles and transition metal-containing particles.

In some embodiments, the preliminary lithium precursor particles may include at least one of lithium hydroxide, lithium oxide and/or lithium carbonate.

In some embodiments, in the recovering the lithium precursor, the preliminary lithium precursor particles may be washed with water.

In some embodiments, the transition metal-containing particles may include nickel, cobalt, manganese or an oxide thereof.

In some embodiments, the transition metal-containing particles may be selectively treating with an acid solution to recover a transition metal precursor in a form of an acid salt.

According to the above-described exemplary embodiments, the lithium precursor may be recovered from a waste cathode active material through a dry-based process utilizing a hydrogen reduction process. Thus, the lithium precursor may be recovered with high purity without performing an additional process resulting from a wet-based process.

In exemplary embodiments, the hydrogen reduction process may include a first hydrogen reduction process performed under a reduced hydrogen concentration condition and a second hydrogen reduction process performed under an increased hydrogen concentration condition. An initial hydrogen concentration may be reduced to prevent a sudden heat generation in the hydrogen reduction, thereby suppressing side reaction and particle aggregation. Accordingly, a recovery ratio of the desired lithium precursor may be enhanced.

BRIEF DESCRIPTION OF THE DRAWING

FIGURE is a schematic flow diagram for describing a method of recovering an active metal of a lithium secondary battery in accordance with exemplary embodiments.

DETAILED DESCRIPTION

Embodiments of the present invention provide a high-purity, high-yield method of recovering an active metal from a lithium secondary battery using a dry-based reductive reaction.

Hereinafter, embodiments of the present invention will be described in detail with reference to the accompanying drawing. However, the embodiments are provided as examples and the present invention is not limited to the specific embodiments described herein.

As used herein, the term "precursor" is used to comprehensively refer to a compound including a specific metal to provide the specific metal included in an electrode active material.

FIGURE is a schematic flow diagram for describing a method of recovering an active metal of a lithium secondary battery in accordance with exemplary embodiments. For convenience of descriptions, FIGURE also illustrates a schematic structure of a reactor together with a process flow.

Referring to FIGURE, a cathode active material mixture (a waste cathode active material mixture) may be prepared from a waste cathode of a lithium secondary battery (e.g., in a process of S10).

The lithium secondary battery may include an electrode assembly including a cathode, an anode and a separation layer interposed between the cathode and the anode. The cathode and the anode may include a cathode active material layer and an anode active material layer coated on a cathode current collector and an anode current collector, respectively.

For example, the cathode active material included in the cathode active material layer may include an oxide containing lithium and a transition metal.

In some embodiments, the cathode active material may include a compound represented by Formula 1 below.

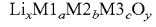  [Chemical Formula 1]

$Li_xM1_aM2_bM3_cO_y$

In Chemical Formula 1, M1, M2 and M3 may include at least one element selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0<x\leq1.1$, $2\leq y\leq2.02$, $0<a<1$, $0<b<1$, $0<c<1$, and $0<a+b+c\leq1$.

In some embodiments, the cathode active material may be an NCM-based lithium oxide including nickel, cobalt and manganese.

The waste cathode may be recovered by separating the cathode from the waste lithium secondary battery. The waste cathode may include the cathode current collector (e.g., aluminum (Al)) and the cathode active material layer as described above, and the cathode active material layer may include a conductive material and a binder together with the cathode active material as described above.

The conductive material may include, e.g., a carbon-based material such as graphite, carbon black, graphene, carbon nanotube, etc. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

In exemplary embodiments, the recovered waste cathode may be pulverized to produce the cathode active material mixture. Accordingly, the cathode active material mixture may be prepared in a powder form. As described above, the cathode active material mixture may include a powder of the lithium-transition metal oxide, e.g., a powder of the NCM-based lithium oxide (e.g., $Li(NCM)O_2$).

The term "cathode active material mixture" used in the present application may refer to a raw material that is input to a reductive reaction treatment to be described later after the cathode current collector is substantially removed from the waste cathode. In an embodiment, the cathode active material mixture may include cathode active material particles such as the NCM-based lithium oxide. In an embodiment, the cathode active material mixture may include portions of components derived from the binder or the conductive material. In an embodiment, the cathode active material mixture may substantially consist of the cathode active material particles.

In some embodiments, an average particle diameter (D50) (e.g., a particle diameter based on a volumetric cumulative particle size distribution) of the cathode active material mixture may be from 5 to 100 μm. Within the above range, a lithium-transition metal oxide such as $Li(NCM)O_2$ to be recovered may be easily separated from the cathode current collector, the conductive material and the binder included in the cathode active material mixture.

In some embodiments, the cathode active material mixture may be heat-treated before being input into a reductive reactor to be described later. Impurities such as the conductive material and the binder included in the cathode active material mixture may be removed or reduced by the heat treatment, so that the lithium-transition metal oxide may be introduced into the reductive reactor with high purity.

A temperature of the heat treatment may be, e.g., from about 100 to 500° C., preferably from about 350 to 450° C. Within the above range, the impurities may be substantially removed while preventing decomposition and damages of the lithium-transition metal oxide.

For example, in a process of S20, the cathode active material mixture may be reacted in a reductive reactor 100 to form a preliminary precursor mixture 80.

As illustrated in FIGURE, the reductive reactor 100 may be divided into a reactor body 130, a lower reactor portion 110 and an upper reactor portion 150. The reactor body 130 may include or may be integrated with a heating tool such as a heater.

The cathode active material mixture may be supplied into the reactor body 130 through a supply flow path 106a and 106b. The cathode active material mixture may be dropped through a first supply flow path 106a connected to the upper reactor portion 150, or may be introduced through a second supply flow path 106b connected to a bottom portion of the reactor body 130. In an embodiment, the first and second supply flow paths 106a and 106b may be used together to supply the cathode active material mixture.

For example, a supporting unit 120 may be disposed between the reactor body 130 and the lower reactor portion 110 so that the waste cathode active material mixture powders may be seated thereon. The supporting unit 120 may include pores or injection holes through which a reductive reaction gas and/or a carrier gas, which will be described later, may pass.

The reductive reaction gas for converting the cathode active material mixture into a preliminary precursor may be supplied into the reactor body 130 through a reactive gas flow path 102 connected to the lower reactor portion 110. In exemplary embodiments, the reductive reaction gas may include hydrogen ($H_2$) as a reaction source.

The reductive reaction gas may be supplied from the lower portion of the reductive reactor 100 to be in contact with the cathode active material mixture, so that the cathode active material mixture may react with the reductive reaction gas to be converted into the preliminary precursor while moving to the upper reactor portion 150 or residing in the reactor body 130.

In some embodiments, the reductive reaction gas may be injected to form a fluidized bed in the reactor body 130. Accordingly, the reductive reactor 100 may be a fluidized bed reactor. The cathode active material mixture may contact the reductive reaction gas while repeatedly rising, staying and falling in the fluidized bed, so that a reaction contact time may be increased and a particle dispersion may be improved. Thus, the preliminary precursor mixture 80 having a substantially uniform size distribution may be obtained.

However, the concepts of the present invention is not necessarily limited to the fluidized bed reaction. For example, a stationary reaction in which a reductive reaction gas is supplied after preloading the cathode active material mixture in a batch type reactor may be performed.

In exemplary embodiments, a first reductive process in which a first reductive reaction gas of a relatively low reducing concentration (a reaction source concentration) is used and a second reductive process in which a second reductive reaction gas of a relatively high reducing concentration is used may be sequentially and continuously performed in the reductive reactor 100.

For example, the first reductive reaction gas having a relatively low hydrogen concentration is used in the first reductive process, and the second reductive reaction gas having a relatively high hydrogen concentration may be used in the second reductive process.

In some embodiments, the hydrogen concentration of the first reductive reaction gas may be in a range from about 5 to 15 volume % (vol %). The hydrogen concentration of the second reductive reaction gas may be in a range from about 20 vol % or more.

For example, the reductive reaction gas may further include a carrier gas such as nitrogen ($N_2$) or argon (Ar). The reducing concentration or hydrogen concentration may be a volume % of a reductive component (e.g., the hydrogen gas) in a total volume of the reaction gas including the carrier gas.

A hydrogen reduction process for metal components such as lithium and transition metals is an exothermic process, and thus as a concentration of the used hydrogen gas increases, a heating amount may rapidly increase. In this case, a temperature in the reductive reactor 100 may also increase, and the cathode active material mixture may be melted or aggregated with each other. Accordingly, a final recovery ratio of a lithium precursor may also be reduced.

When lowering the reaction temperature in the reductive reactor 100 in order to reduce the heating amount, sufficient reaction rate and yield may not be achieved.

However, according to exemplary embodiments, the first reductive process of a low hydrogen concentration may be performed before the second reductive process using an increased hydrogen concentration. The cathode active material mixture may be subjected to a preliminary reductive treatment through the first reductive process. Thus, even when the hydrogen concentration is increased in the subsequent second reductive process, a reductive reaction for sufficient production of the lithium precursor may be implemented while suppressing the rapid heat generation.

In a preferable embodiment, the hydrogen concentration of the first reductive reaction gas may be in a range from about 5 to 10 vol %. The hydrogen concentration of the second reductive reaction gas may be adjusted in a range from about 20 to 40 vol % to suppress the excessive heat generation.

In some embodiments, a reaction temperature in the first reductive process may be in a range from about 300 to 450° C. A reaction temperature in the second reductive process may be higher than the reaction temperature in the first reductive process.

The heating amount may be suppressed through the first reductive process using the first reductive reaction gas of the low hydrogen concentration, and thus the reaction temperature may be relatively increased in the second reductive process using the second reductive reaction gas of the high hydrogen concentration. Thus, sufficient reductive reaction and recovery ratio for the lithium precursor may be achieved through the second reductive process.

For example, the reaction temperature of the second reductive process may be in a range from about 460 to 800° C.

In some embodiments, if the first reductive reaction gas and the second reductive reaction gas are supplied at the same flow rate, a reaction time of the second reductive process may be increased compared to that of the first reductive process. As described above, the heating amount may be suppressed through the first reductive process so that the reaction time of the second reductive process may be increased to obtain the sufficient reductive reaction and recovery ratio for the lithium precursor.

The reductive reaction gas may be supplied from the bottom portion of the reductive reactor 100 to be in contact with the cathode active material mixture, so that the cathode active material mixture may move to the upper reactor portion 150 to expand a reaction region and may be converted into the preliminary precursor.

In some embodiments, the lithium-transition metal oxide may be reduced by the reductive reaction gas to generate a preliminary lithium precursor including, e.g., lithium hydroxide (LiOH), lithium oxide (e.g., $Li_2O$), and a transition metal or a transition metal oxide. For example, Ni, Co, NiO, CoO and MnO may be produced together with the preliminary lithium precursor by the reductive reaction.

Accordingly, the preliminary precursor mixture 80 including preliminary lithium precursor particles 60 and transition metal-containing particles 70 (e.g., the transition metal or the transition metal oxide) may be formed in the reactor body 130. The preliminary lithium precursor particles 60 may include, e.g., lithium hydroxide, lithium oxide and/or lithium carbonate.

The transition metal-containing particles 70 including nickel, cobalt or manganese may be relatively heavier than the preliminary lithium precursor particles 60, and thus the preliminary lithium precursor particles 60 may be collected in advance through outlets 160a and 160b.

In an embodiment, the preliminary lithium precursor particles 60 may be discharged through a first outlet 160a connected to the upper reactor portion 150. In this case, selective recovery of the preliminary lithium precursor particles 60 based on a weight gradient may be promoted.

In an embodiment, the preliminary precursor mixture 80 including the preliminary lithium precursor particles 60 and the transition metal-containing particles 70 may be collected through a second outlet 160b connected to the reactor body 130. In this case, the preliminary precursor mixture 80 may be directly recovered from a fluidized bed forming region to increase a production yield.

In an embodiment, the preliminary precursor mixture 80 may be collected together through the first and second outlets 160a and 160b.

The preliminary lithium precursor particles 60 collected through the outlets 160a and 160b may be recovered as a lithium precursor (e.g., in a process of S30).

In some embodiments, the preliminary lithium precursor particles 60 may be washed with water. The preliminary lithium precursor particles in the form of lithium hydroxide (LiOH) may be substantially dissolved in water by the washing treatment, separated from the transition metal precursor, and recovered in advance. The lithium precursor substantially consisting of lithium hydroxide may be obtained through a crystallization process, etc., of lithium hydroxide dissolved in water.

In an embodiment, the preliminary lithium precursor particles in the form of lithium oxide and lithium carbonate may be substantially removed through the washing treatment. In an embodiment, the preliminary lithium precursor particles in the form of lithium oxide and lithium carbonate may be at least partially converted into lithium hydroxide through the washing treatment.

In some embodiments, the preliminary lithium precursor particles 60 may be reacted with a carbon-containing gas such as carbon monoxide (CO), carbon dioxide ($CO_2$), etc., to obtain lithium carbonate (e.g., $Li_2CO_3$) as the lithium precursor. A crystallized lithium precursor may be obtained through the reaction with the carbon-containing gas. For example, lithium carbonate may be collected by injecting the carbon-containing gas together during the washing treatment.

A crystallization reaction temperature through the carbon-containing gas may be, e.g., in a range from about 60 to 150° C. In the above temperature range, lithium carbonate of high reliability may be produced without damages to a crystal structure As described above, according to exemplary embodiments, the lithium precursor may be recovered from the waste cathode through a continuous dry process.

In a comparative example, a wet process such as a leaching process with a strong acid may be used to recover lithium or a transition metal from a waste secondary battery. However, a selective separation of lithium may be limited in the wet process. Further, a washing process is required to remove solution residues, and by-product formation such as a hydrate may be increased due to a solution contact.

However, according to embodiments of the present invention, the lithium precursor may be collected through a dry reductive reaction in which the use of the solution may be excluded. Thus, production yield may be increased and by-products may be reduced, and wastewater treatment may not be required so that an eco-friendly process design may be implemented.

Additionally, the reductive process may be performed in a stepwise manner by changing the reductive concentration to suppress excessive heat generation, so that the lithium precursor may be recovered with high purity and high yield.

In some embodiments, a transition metal precursor may be obtained from the collected transition metal-containing particles 70 (e.g., in a process of S40).

For example, the preliminary lithium precursor particles 60 may be collected through the outlet 160a and 160b, and then the transition metal-containing particles 70 may be recovered. Thereafter, the transition metal-containing particles 70 may be treated with an acid solution to form precursors in the form of acid salts of each transition metal.

In an embodiment, the preliminary lithium precursor particles 60 and the transition metal-containing particles 70 may be collected together and the washing process may be performed. In this case, the preliminary lithium precursor particles 60 may be converted and dissolved into the lithium precursor such as lithium hydroxide, and the transition metal-containing particles 70 may be precipitated. The precipitated transition metal-containing particles 70 may be collected again and treated with the acid solution.

In an embodiment, sulfuric acid may be used as the acid solution. In this case, $NiSO_4$, $MnSO_4$ and $CoSO_4$ may each be recovered as the transition metal precursor.

As described above, the lithium precursor may be collected by a dry-based process, and then the transition metal precursors may be selectively extracted using the acid solution. Thus, purity and selectivity of each metal precursor may be improved, and a load of a wet process may be reduced so that amounts of wastewater and by-products may also be reduced.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

1 kg of a cathode material separated from a waste lithium secondary battery was heat-treated at 450° C. for 1 hour. The heat-treated cathode material was cut into small units and milled to obtain a sample of a Li—Ni—Co—Mn oxide cathode active material. 20 g of the cathode active material sample was put into a fluidized bed reactor, and a 10 vol % hydrogen/90 vol % nitrogen mixed gas was injected from a bottom of the reactor at a flow rate of 400 mL/min for 1 hour while maintaining a temperature at an inside of the reactor at 460° C. (a first reductive process).

Thereafter, 20 vol % hydrogen/80 vol % nitrogen mixed gas was injected at a flow rate of 400 mL/min for 2 hours (a second reductive reaction process). After the reductive reaction, the sample was recovered, water was added by 19 times (based on a weight), and a concentration of lithium dissolved in water was analyzed to measure a final lithium recovery ratio. Additionally, an increase of a reaction temperature during the reductive process was also measured.

Example 2

Lithium was recovered by the same process as that in Example 1, except that a mixed gas of 5 vol % hydrogen/90 vol % nitrogen was used in the first reductive process, and a mixed gas of 20 vol % hydrogen/80 vol % nitrogen was used in the second reductive process.

Example 3

Lithium was recovered by the same process as that in Example 1, except that the reaction temperature of the first reductive process was adjusted to 400° C. and the reaction temperature of the second reductive process was adjusted to 500° C.

Example 4

Lithium was recovered by the same process as that in Example 1, except that a mixed gas of 15 vol % hydrogen/85 vol % nitrogen was used in the first reductive process.

Comparative Example

Lithium was recovered by the same method as that in Example 1, except that a reductive process was performed by injecting a mixed gas of 20 vol % hydrogen/80 vol % from the bottom of the reactor at a flow rate of 10 mL/min for 3 hours.

The evaluation results are shown in Table 1 below.

TABLE 1

|  | Increase of reaction temperature (° C.) | Lithium recovery ratio (%) |
| --- | --- | --- |
| Example 1 | 16 | 74 |
| Example 2 | 8 | 81 |
| Example 3 | 15 | 80 |
| Example 4 | 18 | 71 |
| Comparative Example | 58 | 60 |

Referring to Table 1, in Examples where the two-step reductive process was performed, the lithium recovery ratio was increased while remarkably suppressing the increase of the reaction temperature when compared to those from Comparative Example.

What is claimed is:

1. A method for recovering an active metal of a lithium secondary battery, the method comprising: preparing a waste cathode active material mixture from a cathode of a lithium secondary battery; sequentially and continuously performing a first reductive process using a first reductive reaction gas and a second reductive process using a second reductive reaction gas that has a higher reaction source concentration than that of the first reductive reaction gas to convert the cathode active material mixture into a preliminary precursor mixture; and recovering a lithium precursor from the preliminary precursor mixture, wherein the first reductive reaction gas and the second reductive reaction gas comprise hydrogen, and the hydrogen concentration of the first reductive reaction gas is in a range from 5 to 15 volume % and the hydrogen concentration of the second reductive reaction gas is 20 volume % or more hydrogen.

2. The method for recovering an active metal of a lithium secondary battery of claim 1, wherein the hydrogen concentration of the first reductive reaction gas is in a range from 5 to 10 volume %, and the hydrogen concentration of the second reductive reaction gas is in a range from 20 to 40 volume %.

3. The method for recovering an active metal of a lithium secondary battery of claim 1, wherein a reaction temperature of the second reductive process is higher than a reaction temperature of the first reductive process.

4. The method for recovering an active metal of a lithium secondary battery of claim 3, wherein the reaction temperature of the first reductive process is in a range from 300 to 450° C., and the reaction temperature of the second reductive process is in a range from 460 to 800° C.

5. The method for recovering an active metal of a lithium secondary battery of claim 1, wherein the first reductive process and the second reductive process comprise supplying the first reductive reaction gas and the second reductive reaction gas, respectively, into a fluidized bed reactor.

6. The method for recovering an active metal of a lithium secondary battery of claim 1, wherein the preliminary precursor mixture comprises preliminary lithium precursor particles and transition metal-containing particles.

7. The method for recovering an active metal of a lithium secondary battery of claim 6, wherein the preliminary lithium precursor particles comprise at least one of lithium hydroxide, lithium oxide and lithium carbonate.

8. The method for recovering an active metal of a lithium secondary battery of claim 6, wherein the recovering the lithium precursor comprises washing the preliminary lithium precursor particles with water.

9. The method for recovering an active metal of a lithium secondary battery of claim 6, wherein the transition metal-containing particles comprise nickel, cobalt, manganese or an oxide thereof.

10. The method for recovering an active metal of a lithium secondary battery of claim 9, further comprising selectively treating the transition metal-containing particles with an acid solution to recover a transition metal precursor in a form of an acid salt.

* * * * *